United States Patent [19]

Bailey et al.

[11] Patent Number: 5,179,709

[45] Date of Patent: Jan. 12, 1993

[54] LOOK AHEAD BUS TRANSFER REQUEST

[75] Inventors: Roger N. Bailey; Robert L. Mansfield; Alexander K. Spencer, all of Austin, Tex.

[73] Assignee: International Business Machines Corporation, Armonk, N.Y.

[21] Appl. No.: 611,380

[22] Filed: Nov. 14, 1990

Related U.S. Application Data

[63] Continuation of Ser. No. 297,715, Jan. 18, 1989, abandoned.

[51] Int. Cl.$^5$ .............................................. G06F 13/00
[52] U.S. Cl. .................................... 395/725; 395/425; 364/964.3; 364/243.2
[58] Field of Search ............................. 395/725, 425; 364/DIG. 1 MS File, DIG. 2 MS File

[56] References Cited

U.S. PATENT DOCUMENTS

| | | | |
|---|---|---|---|
| 4,032,899 | 6/1977 | Jenny | 364/200 |
| 4,060,849 | 11/1977 | Bienvenu | 364/200 |
| 4,067,059 | 1/1978 | Derchak | 364/200 |
| 4,181,936 | 1/1980 | Kober | 364/200 |
| 4,215,400 | 7/1980 | Denko | 364/200 |
| 4,449,183 | 5/1984 | Flahive | 364/200 |
| 4,536,839 | 8/1985 | Shah et al. | 364/200 |
| 4,627,018 | 12/1986 | Trost et al. | 364/900 |

OTHER PUBLICATIONS

D. S. Keener, "Maximizing Direct Memory Access Efficiency in Multi-Master Bus Systems", IBM TDB, vol. 30, No. 12, May, 1988, p. 211.

G. W. Havelick et al., "Automatic Channel Request for Data Transfers", IBM TDB, vol. 24, No. 10, Mar., 1982, pp. 5295-5297.

W. Chapman et al., "Bus Arbitration and Buffer Management", IBM TDB, vol. 30, No. 11, Apr., 1988, pp. 387-391.

M. W. Riley et al., "Automatic Direct Memory Access Buffering in a Mixed-Width/Dual-Memory System Architecture", IBM TDB, vol. 31, No. 1, Jun. 1988, pp. 36-38.

P. A. Buckland et al., "Data Transfer Performance Enhancement for Hard Files", IBM TDB, vol. 31, No. 2, Jul. 1988, pp. 335-337.

Primary Examiner—David Y. Eng
Attorney, Agent, or Firm—Andrea P. Bryant; Thomas E. Tyson

[57] ABSTRACT

A technique for use in an I/O channel to increase bus bandwidth during DMA data transfers between main system memory and a communication link is disclosed, including a pair of buffers, a plurality of counters adapted to selectively contain a count of data increments therein, and enhanced DMA control logic for monitoring buffer data content amount, and at a predetermined time during a given transfer initiating a bus arbitration so that it is completed simultaneously with the given transfer, thereby enabling the next data transfer from the buffer in use to immediately commence.

10 Claims, 5 Drawing Sheets

LOOK AHEAD BUS TRANSFER REQUEST

This is a continuation of application Ser. No. 07/297,715 filed Jan. 18, 1989 now abandoned.

BACKGROUND OF THE INVENTION

1. Field of the Invention

This invention relates to direct memory access (DMA) bus arbitration. More particularly, it relates to a technique for achieving more efficient bus usage by performing arbitration for the next transfer during the current transfer.

2. Description of the Prior Art

The prior art contains many attempts to maximize bus usage and improve performance during DMA transfers. IBM Technical Disclosure Bulletin, Vol. 30, No. 12, May, 1988, Page 211 describes a technique in which a DMA arbitration results in a larger data transfer to reduce the total amount of arbitrations that must occur to pass a given data block. IBM Technical Disclosure Bulletin, Vol. 24, No. 10, March, 1982, Page 5295 discloses an arrangement which provides for an automatic channel request in order to reduce data store size requirements and the amount of microcode for performing a DMA transfer.

Commonly assigned U.S. application Ser. No. 176,122, filed Mar. 31, 1988 now U.S. Pat. No. 4,912,632 relates to a memory subsystem controller including means for causing a memory transfer initiated by the DMA to be interrupted at a cache line boundary to service a processor request and thereafter resume data transfer.

Concurrently filed, commonly assigned U.S. application Ser. No. 07/297,778, herewith incorporated by reference, relates to a DMA controller requiring no intervention from a main processor once the first of a series of block transfers has begun.

Typically in the prior art one DMA data transfer is completed before another bus arbitration occurs. Not only does bus arbitration consume overhead in prior art systems, which in itself is undesirable, there may be sufficient idle time on the bus for a request from some other device to be granted before the next DMA bus request is raised, thereby delaying the grant which would allow another DMA data transfer to commence.

It is desirable to minimize idle time on the bus and to minimize the time between DMA arbitration initiations necessary to transfer large amounts of data. In the prior art there is no teaching, however, of optimizing bus bandwidth by initiating a bus request for an ensuing transfer while a current transfer is still in progress, thereby enabling back to back DMA transfers.

SUMMARY OF THE INVENTION

The present invention overcomes the prior art shortcoming and optimizes bus usage by minimizing the number of cycles where nothing useful occurs by "hiding" bus arbitration within data transfer cycle time. In a preferred embodiment, the present invention is utilized in a communications I/O channel driven by a main system processor and connecting the main processor to a communications link. The channel hardware provides communication protocols and data transfer, using DMA technology, between the communications link and the main system processor storage.

The I/O channel includes three asynchronous circuits operating independently as well as a pair of buffers and several counters. A DMA controller monitors the state of DMA buffers and acts to fill or empty them when appropriate, based on the type of transaction in progress. A transmit circuit includes logic for removing data from the DMA buffers and placing it on the communications link. A receive circuit includes logic for taking data from the link and placing it into the DMA buffers.

A counter associable with each buffer during transmit operations is included in the DMA controller. Two counters are used to maintain the count of cache line units stored within the buffers during receive operations.

When receiving data from the link, the receive logic counts data as it is received and loads the cache line counter associated with each buffer with the number of cache lines received. The DMA controller transfers data over a shared I/O bus in cache line increments to main storage, decrementing the cache line counter on each line transfer until all current cache lines have been transferred.

While each transfer is in progress, the DMA controller determines if another cache line is to be transferred. If so, the controller then places a request on the bus before the transfer in progress is completed. Thus, the next transfer may begin immediately.

When transmitting data, the DMA controller reads from a tag word table which is resident in the channel. This table was loaded by the system processor with, inter alia, DMA addresses of data to be transmitted and the count of cache lines of data to be transmitted from those addresses.

The DMA controller then compares the count of cache lines in the tag table entry with the capacity of one of its pair of buffers and loads its cache line counter with the lesser of the total number of cache lines to be transmitted or the number of cache lines which may be accomodated in one buffer. The tag table cacheline count is decremented by the buffer capacity and if there is a positive remainder, that value replaces the original tag table cache line count. In this way the DMA controller will be able to know that more data remains to be transferred.

Data is retrieved from main system storage in cache line increments, and the DMA controller decrements its cache line counter until one of its pair of its buffers is filled.

If there is more data to be transmitted, the DMA controller fills the other of its buffers as above described while the first buffer is emptied onto the link by the transmit logic. The DMA controller iterates these steps until all data is transferred.

By using cache line counters to track when the associated buffers will be full, the DMA controller is able to prerequest the bus when necessary to enable back to back transfers. In this way the arbitration sequence occurs within transfer cycle time, increasing bus bandwidth.

Monitoring buffer status during transfer and communicating that status to independent data transfer circuits has several advantages. Multiple cache line transfers can be transferred between logic partitions without intervention between each. A bus request for a subsequent data transfer may be made before a current transfer is complete, pipelining arbitration into the transfer to better utilize available bus bandwidth to transfer data.

BRIEF DESCRIPTION OF THE DRAWING

The above and other features and advantages of the present invention will be better understood from the following description taken in connection with the drawing in which like reference characters are used throughout to denote the same elements and wherein.

DETAILED DESCRIPTION OF THE PREFERRED EMBODIMENT

Figure 1:
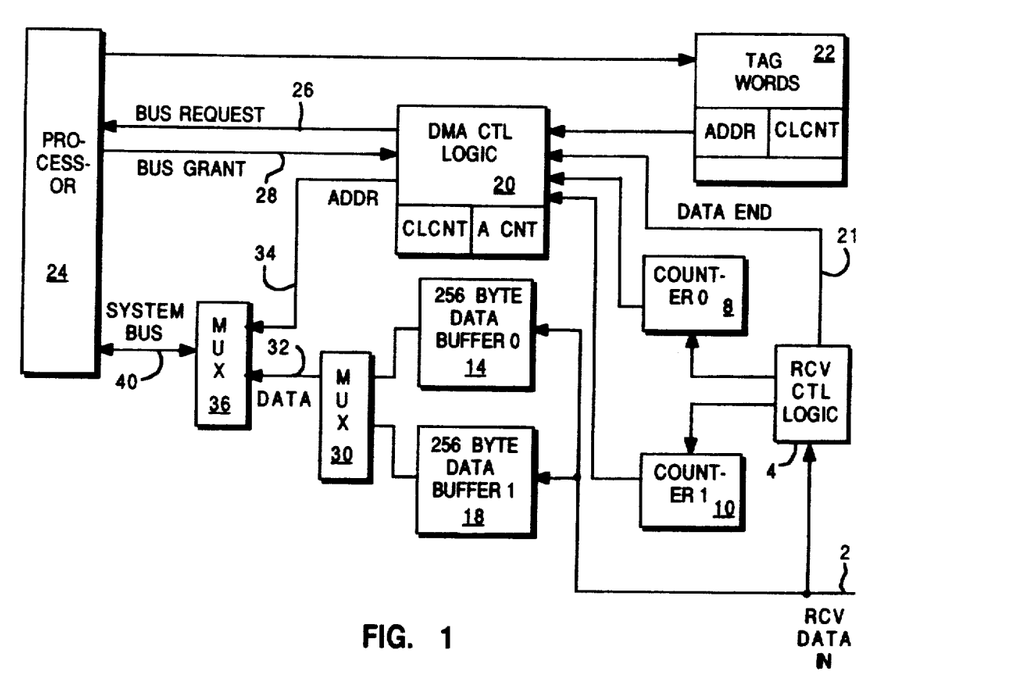
FIG. 1 is a logical block diagram of an I/O channel in which the present invention is embodied, particularly illustrating elements of receive logic.

Refer now to FIG. 1 which is a schematic block diagram of an I/O channel, in which the present invention is provided. Serial data is received from a communications link over line 2. Receive control logic 4 counts received bytes in cache line increments and loads the result in either of cache line counters 8 and 10. Cache line counter 8 is associated with data buffer 14, and cache line counter 10 is associated with data buffer 18. In this exemplary, preferred embodiment a cache line increment is 64 bytes, and the capacity of each buffer 14 and 18 is 256 bytes. Therefore, cache line counters 8 and 10 contain values 0, 1, 2 or 3 to correspond to 64, 128, 192 or 256 bytes, respectively.

Counters 8 and 10 are accessible by DMA control logic 20. DMA control logic 20 reads a tag word from tag word table 22 which is provided by system processor 24 with a plurality of entries, each including the main memory address ADDR which will receive the data from the link and a cache line count CLCNT, which for receive operations is set to some maximum value since the amount of data coming in from the link is unknown until an end of data indicator is received. This condition is made known to DMA control logic 20 over line 21.

When DMA control logic 20 determines from an interrogation of the active cache line counter 8 or 10 that either of buffers 14 and 18 is approaching the full state, or receives an end of data signal, it issues a request over bus request line 26. A bus grant signal is input to DMA control logic 20 over line 28.

Data is output from buffer 14 or 18 in 8 byte increments through multiplexer 30 for placement on 8 byte wide data bus 32. Data bus 32 and address line 34, carrying the main storage address obtained by DMA control logic 20 from tag word table 22, are input to multiplexer 36 for placement on shared I/O bus 40.

Figure 2:
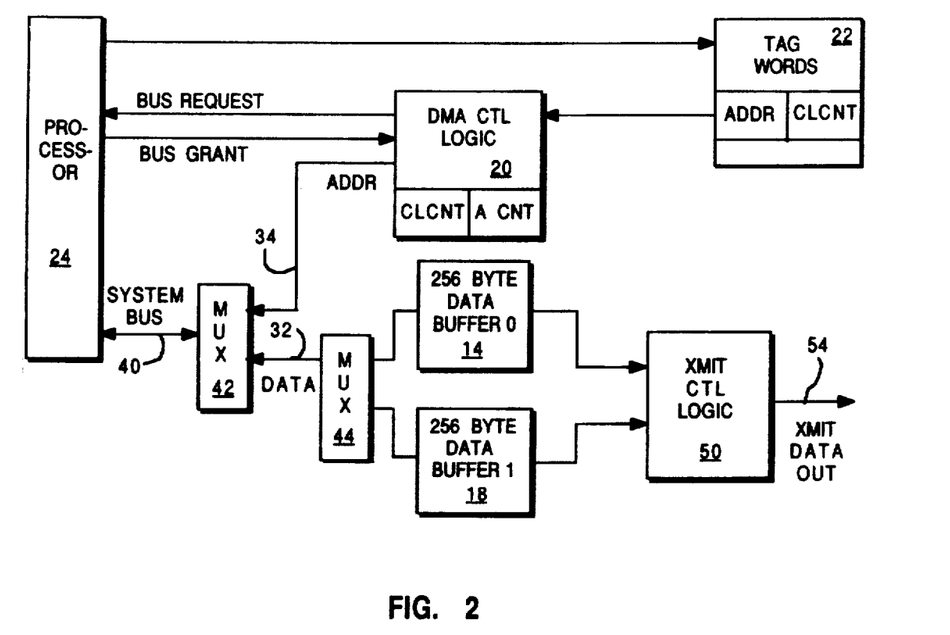
FIG. 2 is a logical block diagram similar to FIG. 1, illustrating elements of transmit logic.

Refer now to FIG. 2, a block diagram of the I/O channel embodying the present invention, particularly illustrating transmit logic. Data is placed on shared I/O bus 40 from system processor 24 under control of DMA control logic 20 and loaded alternately into buffers 14 and 18. System processor 24 loads tag word table 22 with an entry containing the address ADDR in main memory from which data is to be transmitted as well as the amount of data, in cache line increments CLCNT, to be transmitted. DMA control logic 20 loads its address counter ACNT with the contents of the tag word table entry ADDR. DMA control logic 20 then loads its cache line counter CLCNT with the lesser of the tag table CLCNT remaining to be transmitted, as determined by subtracting buffer capacity from the tag table CLCNT, or buffer size, i.e., the maximum number of cache line increments able to be placed in the buffer. If that difference is greater than 0, the tag table CLCNT is replaced by that difference.

DMA control logic 20 initiates a main memory read in a conventional manner. Data on shared I/O bus 40 passes through multiplexers 42 and 44 and is loaded alternately into buffers 14,18 as earlier described.

As this buffer load operation occurs, DMA control logic 20 monitors its CLCNT. If the DMA CLCNT is not 0, more data is to be transferred. Thus, DMA control logic 20, in a manner similar to that described in connection with FIG. 1, issues a bus request at a point in time preceeding the completion of the current data transfer.

When either buffer 14 or 18 becomes filled, transmit control logic 50 empties that buffer's contents onto serial data line 54 to the communications link.

Figure 3:
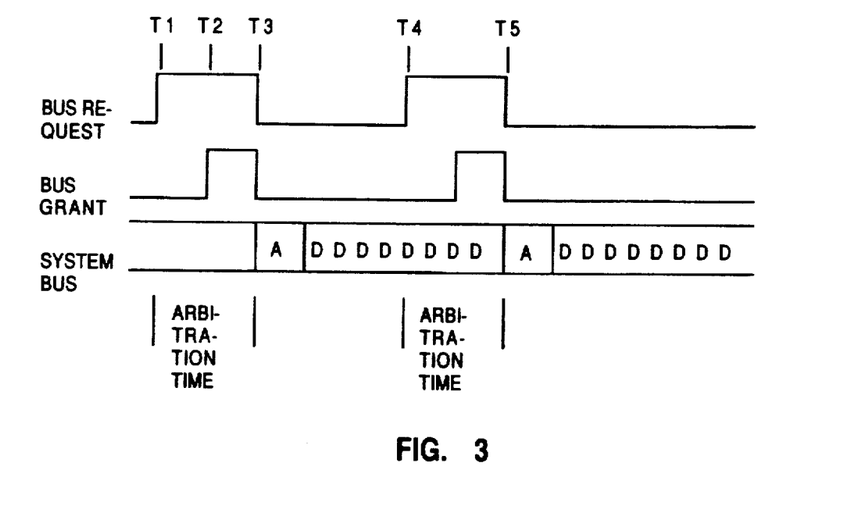
FIG. 3 is a timing diagram of receive operation.
Figure 4:
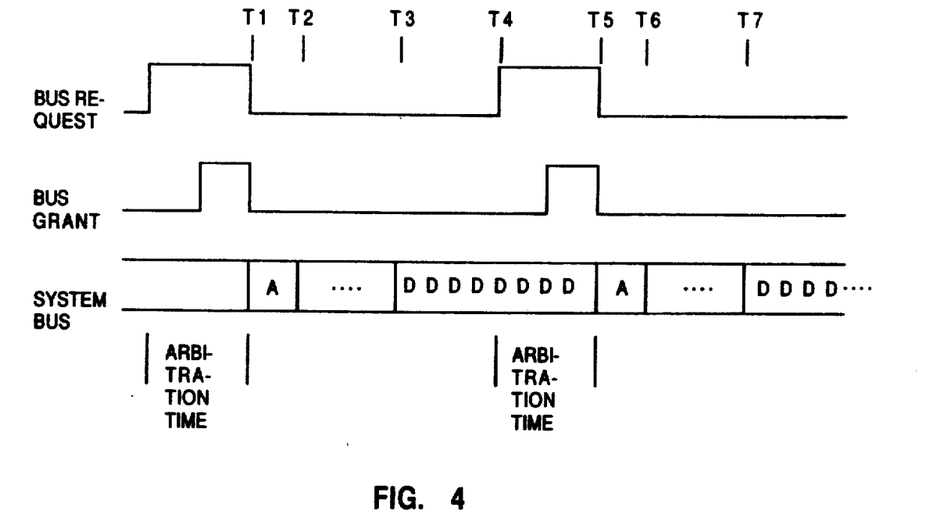
FIG. 4 is a timing diagram of transmit operation.

In both FIGS. 3 and 4 the character A represents an address in main system memory. Each instance of the character D represents eight bytes of data, the total of eight Ds being one cache line increment in this exemplary embodiment.

FIG. 3 graphically indicates in a timing chart, the nature of the performance enhancements provided by the present invention's enabling back to back data transfers of data received from a communications link to system processor memory over shared I/O system bus 40. Second and subsequent bus arbitrations occur even though data previously placed on bus 40 has not been completely transferred.

At time T1 the first bus request is issued. In response, bus grant comes up at time T2. An address and data are placed on the bus at time T3. By time T4, DMA control logic 20 has determined it necessary to again issue a bus request, though the previous data transfer is incomplete. The bus request is overlapped with data transfer. At time T5 the second bus grant is received, coincident with completion of the data transfer. Following the last data transfer an address and data associated with the next cache line data transfer is placed on the bus.

FIG. 4 is a timing chart illustrating how bus arbitration occurs in the midst of data transmission from bus 40 to the communications link. At time T1 the first bus arbitration cycle completes and DMA control logic places the address ADDR from tag table 22 on the bus. There follows some idle time on the bus between T2, when DMA control logic 20 accessed main memory and T3, the point in time at which data from that address in main memory is placed on the bus. Advantageously in the present invention there is some compensation for that idle period because at time T4, while data is being transferred, DMA control logic 20 raises a bus request. Coincident with the grant being given is the completion of the previous data transfer cycle at time T5. DMA control logic 20 immediately places the next address retrieved from tag table 22 on bus 40. Again there is some idle period on the bus while the access to main memory takes place between times T6, the end of the address, and T7, the time at which data is placed on the bus.

It should be noted in connection with FIGS. 3 and 4 that in the event a bus grant is not received coincident with the completion of tranfer of a cache line increment of data, the improved DMA control logic of the present invention essentially remains in hold until such time as the bus grant is received. In other words, once bus availability is interrupted, e.g. because the system processor gave control of the bus to another device, the present invention enables data transfer to resume its transfer operation immediately upon receipt of the bus grant.

Figure 5:
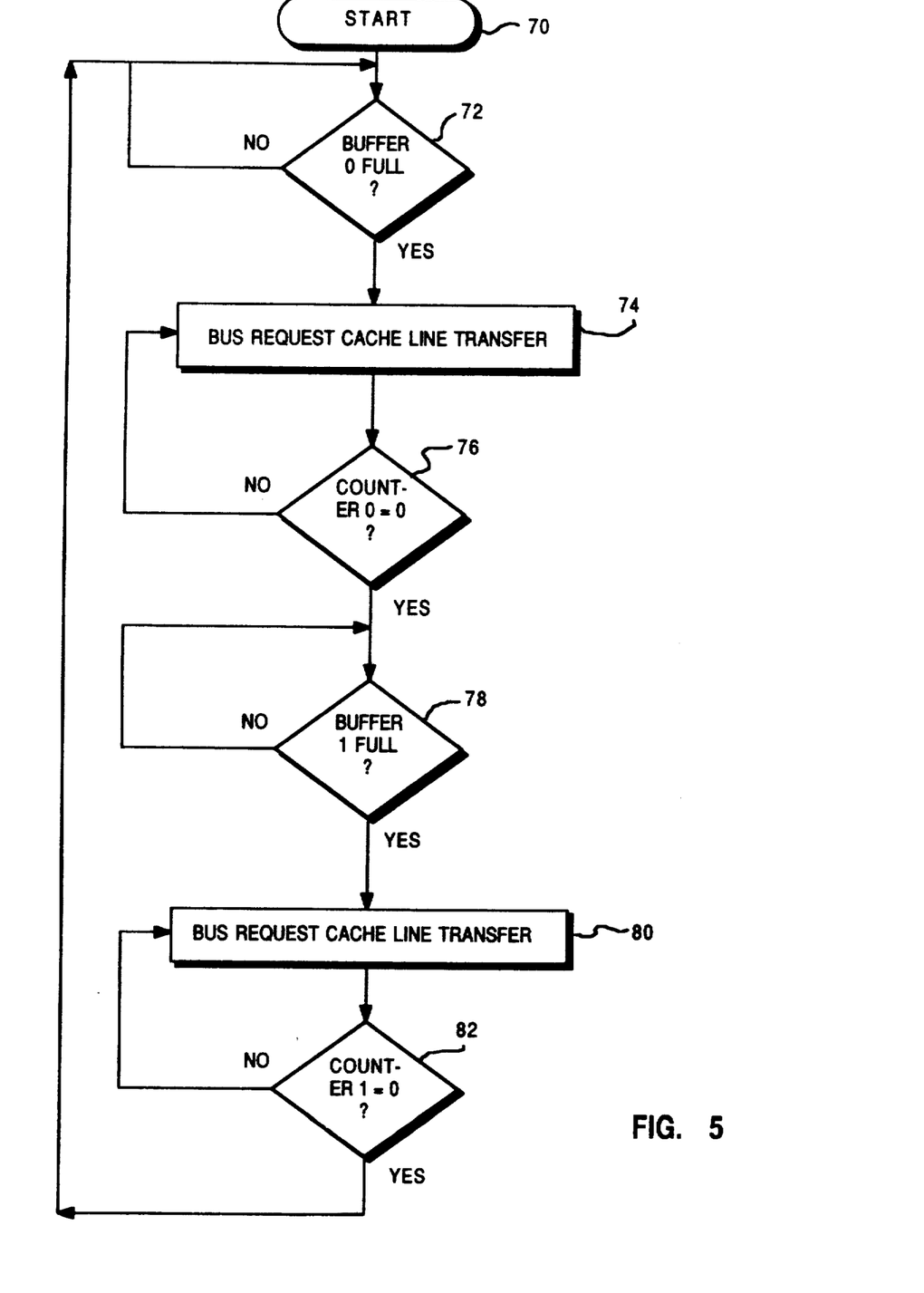
FIG. 5 is a flow chart of receive logic.

Refer again to FIG. 1 in connection with FIG. 5, a flow chart illustrating DMA control logic 20 during receive operations. The beginning of any given receive operation is indicated at terminal 70. DMA control logic 20 at decision block 72 interrogates counter 8 to determine if buffer 14 has been completely filled by receive logic 4. If not, DMA control logic iterates until it finds a positive response, upon receipt of which it raises at block 74 a bus request and conducts a cache line transfer and decrements its cache line counter CLCNT. As above described, DMA control logic 20 then at decison point 76 tests its CLCNT; and if that value is greater than 0, returns control to block 74.

When it is determined that CLCNT is 0, DMA logic queries the content status of buffer 18 at decision block 78 by examining counter 10. If buffer 18 is not full, the query sequence is repeated until the buffer is full. Then, at block 80 DMA control logic 20 again raises a bus request on line 26 and upon recipt of a grant over line 28 performs a cache line transfer. As before, the DMA CLCNT is decremented. The new value of DMA CLCNT is tested at block 82. While DMA CLCNT is greater than 0 as indicated at test 82, the data tranfer counter decrement sequence is repeated. When DMA CLCNT goes to 0, the sequence beginning at query block 72 is repeated.

Figure 6:
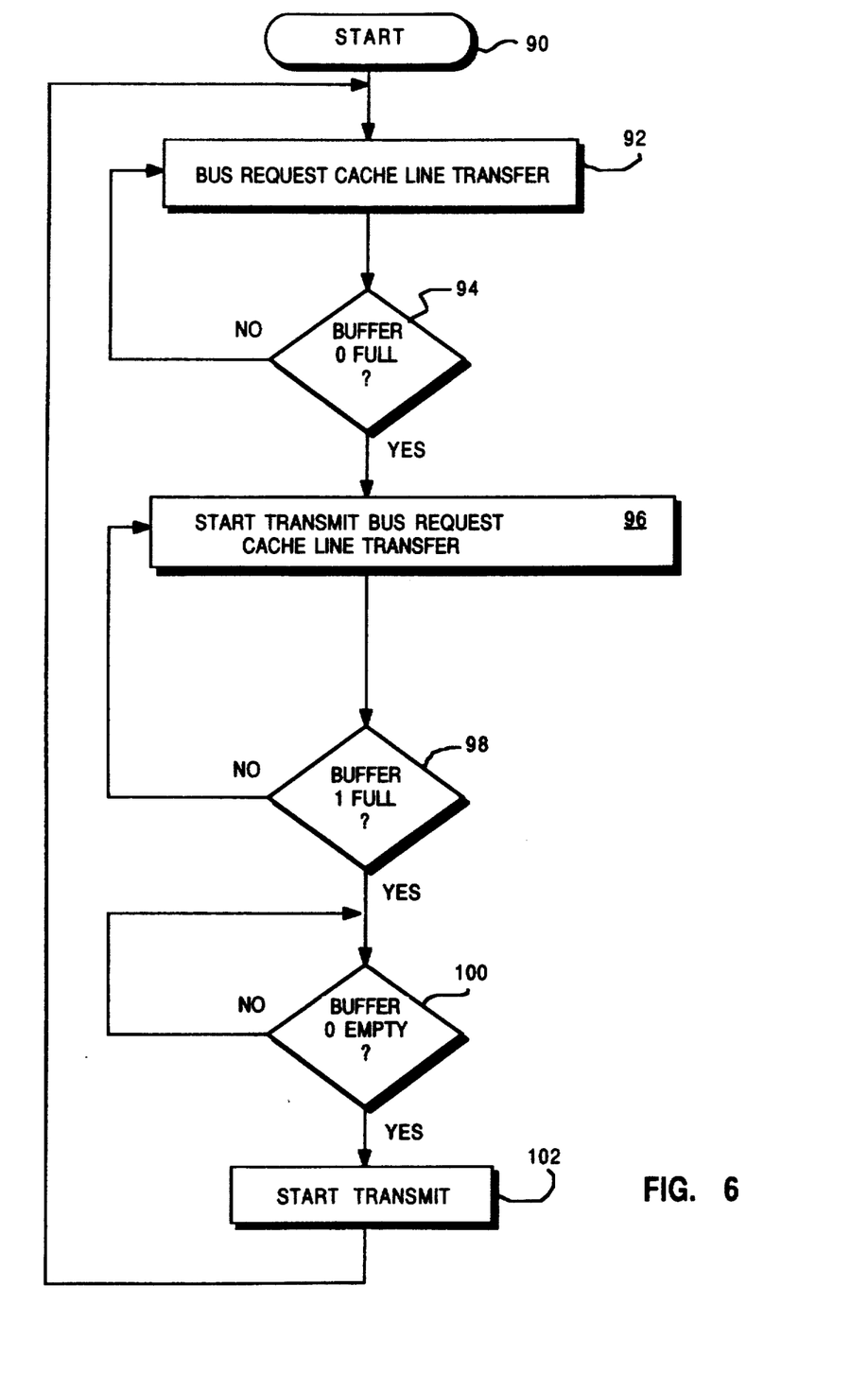
FIG. 6 is a flow chart of transmit logic.

FIG. 6 is a flow chart of DMA control logic 20 during transmit operations and will be described having reference to FIG. 2 as well. Any given transmit operation begins as indicated at terminal 90. DMA control logic 20 at step 92 raises a bus request on line 26. Upon receipt of a grant on line 28, the address in main system memory is placed on the bus for accessing main memory. Data in a cache line increment is placed on the bus and loaded first into buffer 14. As before, the DMA CLCNT is decremented. At step 94 DMA control logic 20 determines if that buffer is full and continues the sequence of steps 92 and 94 until a full condition is indicated. When that condition occurs, control is passed at step 96 to transmit logic 50 for transmitting the data from buffer 14 to the communication link over serial line 54.

While transmit logic 50 empties buffer 14, DMA control logic begins loading buffer 18. This operation entails a bus request and accessing of main memory for placing the next cache line increment of data on the bus.

DMA control logic 20 then at step 98 determines whether buffer 18 is full. The bus request main memory access sequence just noted is repeated until buffer 18 is full. DMA control logic 20 then loops through step 100 until transmit logic 50 has completed the transmission of data from buffer 14. Then at step 102 DMA control logic 20 instructs transmit logic 50 to empty buffer 18 data onto line 52.

The entire sequence from step 92 through step 102 is repeated until the entire amount of data to be transmitted has been sent to the communications link.

While the present invention has been described having reference to a preferred embodiment, including particular data increments and bus sizes, those having skill in the art will understand that various modifications in form and detail and data rates may be made without departing from the spirit and scope of the invention as claimed.

We claim:

1. Improved access control logic for optimizing bus usage during DMA block data transfers across a non-dedicated bus between a main memory and an external device comprising:

first and second buffers for storing incremental data units of a contiguous data block to be transferred;

logic means for determining a total count of incremental data units of said contiguous data block to be transferred;

circuit means for interconnecting said bus and said external device for transferring incremental data units of said contiguous data block from one of said first or second buffers therebetween;

means for storing data into the other of said first or second buffers during the transfer by said circuit means;

means, associated with said means for transferring, for updating said total count of incremental data units to be transferred at each transfer; and means responsive to said updating means for continually issuing a bus request for transfer of a subsequent incremental data unit from said contiguous data block before completion of transfer of a previous incremental data unit until said updating means indicates that the contiguous data block transfer is complete.

2. The apparatus of claim 1 wherein, during data transfer from said external device to said main memory, said logic means further includes in-counter means associated with said buffer storage; and receive logic for counting incremental data units as they are received, loading said incremental data units in said one of said first or second buffers, and placing a total count of incremental data units received in said in-counter means.

3. The apparats of claim 2 wherein:

said means for transferring includes means for placing said one of said first or second buffer contents on said non-dedicated bus; and said means for updating includes means for decrementing said in-counter means.

4. The apparatus of claim 1 wherein, during data transfer from said main memory to said external device, said means for determining further includes out-counter means adapted to accept a count of data increments from a processor controlling said main memory.

5. The apparatus of claim 4 wherein said means for updating comprises means for decrementing said out-counter means.

6. A method of minimizing idle time of a shared I/O bus during DMA transfer, over the bus to a main memory from an external device, of a contiguous block of data in increments of a fixed size comprising the steps of:

a. loading data of said contiguous block from the external device alternately in a pair of buffers, each adapted to contain an internal number of said fixed size increments;

b. determining the data amount content of each buffer;

c. initiating whenever step b indicates one buffer is full, a DMA transfer of a fixed size increment of data from that full buffer to the I/O bus;

d. issuing a bus request for each subsequent data transfer from that buffer before transfer of a previous increment of data is complete as long as a buffer contains data to be transferred;

e. storing data into the other buffer until full; and f. sequentially repeating steps a through e until the contiguous block of data is transferred.

7. DMA control apparatus for transferring a contiguous block of data from a main system processor over a shared bus to an external device comprising:

means for temporarily storing said contiguous block of data as a plurality of incremental data units to be transferred into a first and second buffer;

means for indicating in real time how many incremental data units to be transferred remain;

means responsive to said indicating means for placing incremental data units alternatingly from one of said first or second buffers on the bus until said indicating means indicates that the contiguous block of data has been transferred;

means for storing data into the other of said first or second buffer during the bus transfer by said placing means; and means cooperable with said placing means for overlapping a bus request for transfer of a subsequent incremental data unit from those temporarily stored with transfer of a previous incremental data unit until said indicating means indicates that the contiguous block of data has been transferred.

8. The DMA control apparatus of claim 7 additionally including:

means connected to said means for placing for entering a hold state until a bus grant is received.

9. A method of providing back to back DMA data transfers to a system processor main memory from a serial communication link comprising the steps of sequentially:

(i) loading data from said link in one of a first or second buffer;

(ii) maintaining a current count of data in each of said buffers;

(iii) initiating bus arbitration only in response to said current count indicating a full condition in one of said buffers;

(iv) alternatingly placing data from said one of said buffers on a bus to said main memory;

(v) storing data into the other of said buffers while data from said one of said buffers is placed on the bus; and (vi) repeating the preceding steps until an end of data condition is detected on said link.

10. The method of claim 9, including after step (iii) the additional step of:

entering a hold state until a bus grant is received.

* * * * *

UNITED STATES PATENT AND TRADEMARK OFFICE
CERTIFICATE OF CORRECTION

PATENT NO. : 5,179,709

DATED : Jan. 12, 1993

INVENTOR(S) : Roger N. Bailey, Robert L. Mansfield and Alexander K. Spencer

It is certified that error appears in the above-identified patent and that said Letters Patent is hereby corrected as shown below:

Col. 6, line 13, please delete "for";

line 39, please delete "apparats" and insert --apparatus--; and     line 60, please delete "internal" and insert --integral--.

Signed and Sealed this

Second Day of May, 1995

Attest:

BRUCE LEHMAN

*Attesting Officer*      *Commissioner of Patents and Trademarks*